United States Patent [19]

Krofta

[11] 4,377,485

[45] Mar. 22, 1983

[54] APPARATUS AND METHOD FOR CLARIFICATION OF WATER USING COMBINED FLOTATION AND FILTRATION PROCESSES

[75] Inventor: Milos Krofta, Lenox, Mass.

[73] Assignee: Lenox Institute for Research, Inc., Lenox, Mass.

[21] Appl. No.: 302,566

[22] Filed: Sep. 15, 1981

[51] Int. Cl.³ .................... B01D 21/01; B01D 21/08
[52] U.S. Cl. .................... 210/704; 210/793; 210/221.2; 210/275; 210/530
[58] Field of Search ............ 210/520, 525, 530, 532.1, 210/540, 221.2, 275, 195.3, 256, 260, 295, 314, 265, 703, 705, 793; 162/190, 704

[56] References Cited

U.S. PATENT DOCUMENTS

| | | | |
|---|---|---|---|
| 3,307,701 | 3/1967 | Krofta | 210/221.2 |
| 3,820,659 | 6/1974 | Parlette | 210/221.2 |
| 4,022,696 | 5/1977 | Krofta | 210/520 |
| 4,303,517 | 12/1981 | Love et al. | 210/520 |

Primary Examiner—Charles N. Hart
Assistant Examiner—Wanda L. Millard
Attorney, Agent, or Firm—Edward T. Connors

[57] ABSTRACT

Apparatus and a method for removing suspended particles from water in a circular tank having a distribution and flocculation chamber immersed in the tank of water and carried circularly around the tank by a carriage. Flocculating material and inlet water are introduced into the body of water from the moving flocculating chamber at the same rate as clarified water is discharged through a filter substantially covering the bottom of the tank. A majority of particles in the water is collected by flocs in the water and floated to the water surface by air bubble action. The floating sludge is removed by a spiral scoop carried by the carriage. The water is then passed through the bottom filter which removes the remaining flocs completing the clarification of the water for discharge. Apparatus is provided for selectively back washing sections of the filter while the remainder of the filter is in operation.

9 Claims, 4 Drawing Figures

Fig. 3.

APPARATUS AND METHOD FOR CLARIFICATION OF WATER USING COMBINED FLOTATION AND FILTRATION PROCESSES

BACKGROUND OF THE INVENTION

1. Field of the Invention

This invention relates to apparatus and a method for clarifying water wherein the recovery of suspended particles is effected by simultaneous flotation and filtration of the suspended particles.

2. Description of the Prior Art

The demand for potable water has increased to the extent that sources of low quality water must be used to supply the increased demand. Treatment of such low quality water is necessary in order that it be of acceptable quality in appearance and safety. The water must be clear and free from suspended particles and harmful bacteria, and organic matters. Water may be made safe by chlorination and oxidation processes, and suspended particles may be removed by flotation and filtration processes.

Both the flotation and filtration processes may use the flocculation principle in which alum or other chemicals are introduced into the water to react with dissolved chemicals in the water or other added chemicals to form flocculates or so-called "flocs." The flocs are microscopic in size and have a somewhat fluffy structure resembling a snowflake or a small tuft of wool.

In treating water to make it potable it is preferable to use a minimum of flocculation agents particularly because of the cost of the large quantities required. A longer time is required when a smaller amount of flocculation agents is used in order to allow sufficient contact time for the precipitation action to take place and form flocs. After the flocs have been formed it is important that water containing the flocs is not unduly subjected to vigorous motion as by passing the water through pumps, piping, etc. which tend to break the flocs mechanically. However, in the formation of the flocs gentle agitation is necessary to bring the reacting agents into contact to form the flocs and to bring small flocs into contact to form larger flocs or clusters thereof. Upon formation the flocs engage small particles in their fluffy structure. Flocs in water settle at a theoretical rate of about one inch per minute resulting in a clarification rate of 0.5 gallon per minute per square foot of sedimentation area.

In the flotation process of flocculation air dissolved in water is introduced into the water containing the flocs and microscopic bubbles of air form on the flocs causing the flocs to be floated upwardly at a theoretical rate of about 12 inches per minute resulting in a theoretical clarification rate of $7\frac{1}{2}$ gallons per minute per square foot of flotation area. It will be noted that the flotation process is faster than the sedimentation process.

Prior apparatus for water clarification which utilized the flotation process was described in U.S. Pat. No. 4,022,696 which issued May 10, 1977 to Milos Krofta, the inventor herein. This patent disclosed a flotation tank in which its height is low compared to its area. A wheeled carriage was supported between the upper edge of the flotation tank and a central structure. A motor drive moved the carriage in a circular path around the tank. Inlet water was piped upwardly through the central structure and dispensed into the tank by means of a radially extending perforated pipe. Prior to entry into the inlet pipe, the water was treated by the injection of air and flocculating chemicals. As the water exited through the perforated pipe expansion took place and microscopic bubbles were produced which attached themselves to suspended particles in the water and tended to float the solid particles to the surface. The earlier carriage was rotated at a rate of one revolution in 2 to 3 minutes so that the majority of the suspended particles were floated to the surface by the time a revolution of the carriage had taken place.

In the Krofta patent the floated particles combined to form a floating sludge on the surface of the water which was removed by a rotating spiral scoop and discharged into a sludge compartment in the central structure. At the same time clarified water flowed from the lower portion of the tank under the action of gravity through a discharge pipe. If further clarification was required, the discharged water was passed through a filter, the constructions of which are known in the art.

SUMMARY OF THE INVENTION

The present invention is an improvement of the apparatus described in the prior Krofta patent and provides an improved apparatus and a method for clarifying water utilizing both flotation and filtration processes.

In accordance with the invention there is provided an improved apparatus and method for clarifying water for drinking purposes in which effective results are achieved in a simple and compact structure. The retention time for water processed according to the invention is of the order of 5 to 20 minutes and the clarification load is from 2 to 5 gallons per minute per square foot of area. These results are accomplished using tanks in which the depth of water being treated is only about one third of the depth of competitive systems.

As in the prior Krofta patent the carriage is supported by the upper edge of the clarification tank and central supporting means. Inlet water is introduced through the central supporting means and dispensed by the carriage into the tank. A slowly moving skimmer supported by the carriage removes floated solids or sludge from the surface of water in the tank for discharge disposal. A second skimmer may be used to collect a portion of the sludge and introduce it into the tank to aid in the flocculation process.

In the apparatus in accordance with the invention a filter is provided on the tank bottom for removal of unfloated flocs and particles from the water. The apparatus includes a mechanism for effecting the back washing of a portion of the filter while the remainder of the filter is in operation. Preferably the back washed sediment or sludge is reintroduced into the clarification tank for recycling.

The present apparatus is directed towards both the flotation and the filtration process. In the clarification of water with a low particle count utilizing alum as a flocculating agent it is possible that some of the alum may not be flocculated or that the flocs are small and not floated in which event these materials are easily removed by the bottom filter.

The present apparatus includes a moving flocculation chamber structure in which a perforated plate distributes incoming water with water in the tank before its entry into the baffled portion of the flocculation chamber. Preferably the baffle plates are of corrugated shape with the corrugations running in the vertical direction. In its passage between the baffle members, the alum treated water is agitated gently and brought into contact with dissolved hardeners in the water so that the flocculation time is reduced.

A feature of the invention is the provision of the filter bed substantially over the bottom of the clarification tank outwardly of the central supporting structure. It has been heretofore believed that clarified water is best removed from a flotation type clarification tank by perforated pipes located low in the clarification tank and positioned close to the front of a circulating carriage used to introduce water to be treated.

Applicant has found that improved results occur if the clarified water in such flotation systems is removed from the clarification tank at locations considerably in advance of the moving carriage. This discovery has been utilized advantageously in the apparatus in accordance with the invention by combining clarified water removal means for a flotation tank with filter. The improved result is the elimination of the clarified water intake pipes from the moving carriage together with piping to a filtration tank if one is used after clarification by flotation.

In addition to inclusion of the filter in the flotation clarification tank with its back washing feature, the backwashed sludge containing small flocs, particles, and alum is recycled back into the clarification tank for reprocessing, with minimum damage to the structural formation of the small flocs, thus resulting in an improved operation.

A still further advantage of the inclusion of the filter bed at the bottom of the flotation tank together with the configuration of the present apparatus results in the formation of gentle currents in the body of water in the clarification tank. These currents coact with the currents caused by the bubbling action of the dissolved air on the upwardly moving flocs so that the upward path of such flocs is directed away from the vertical direction of prior constructions and thereby provides a longer path for the upwardly moving flocs resulting in enhanced pick-up of particles of impurities in the water.

Other objects and advantages of the invention will be apparent from the following description and from the accompanying drawings which show, by way of example, an embodiment of the invention.

DESCRIPTION OF THE PREFERRED EMBODIMENT

Figure 1:
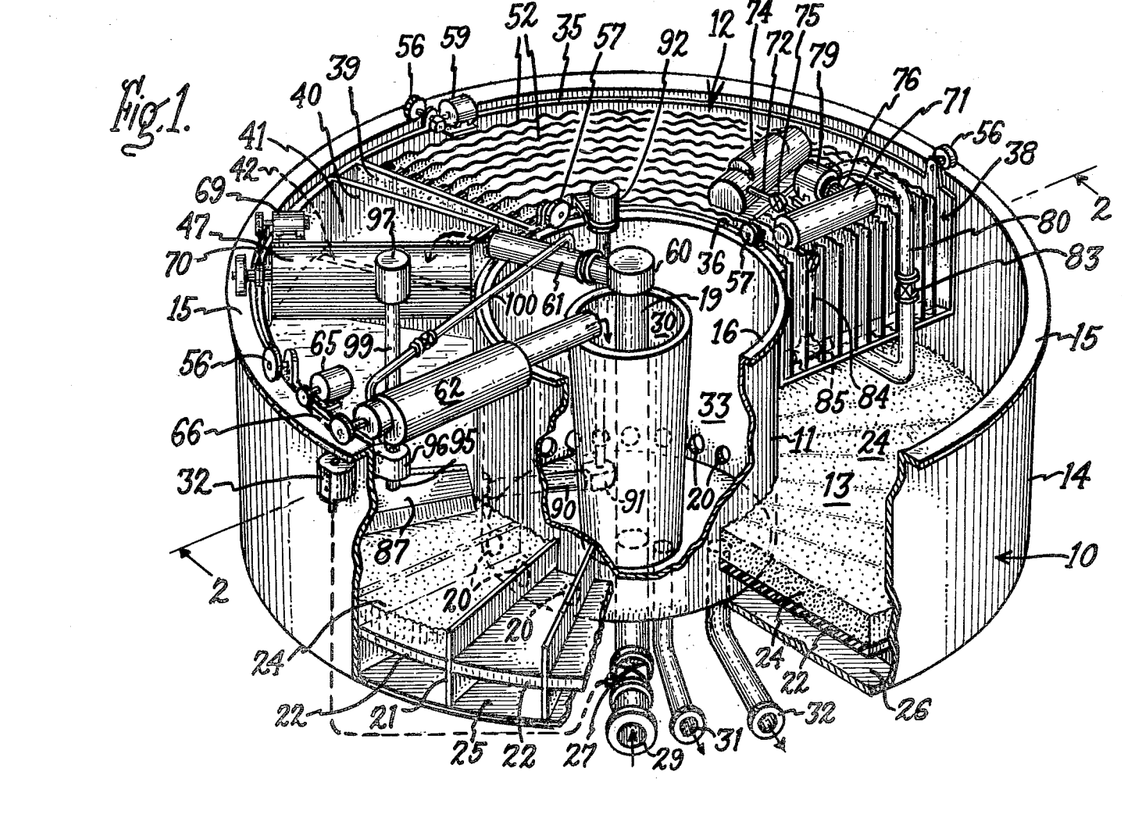
FIG. 1 is a fragmentary perspective view of the apparatus in accordance with the invention.
Figure 2:
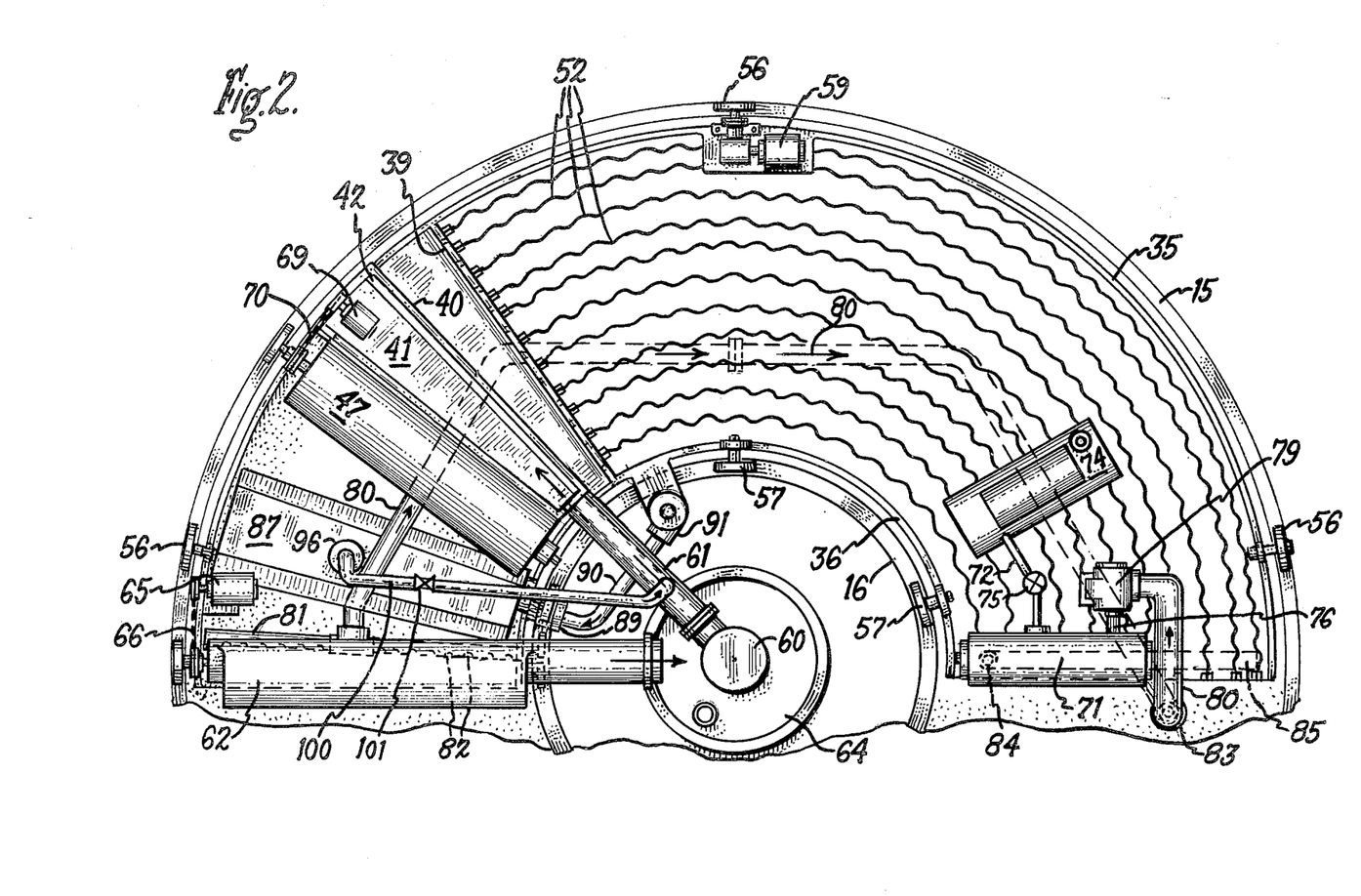
FIG. 2 is a fragmentary top view showing generally the portion of FIG. 1 indicated by the lines marked 2—2.

Referring to the drawings there is shown in FIG. 1 apparatus for purifying water in which the solids are removed by means of a combination of flotation and filtration process.

The apparatus includes a tank generally indicated by the numeral 10 having a centrally positioned compartment wall 11 and a carriage generally indicated at 12 supported between the upper edge of the tank 10 and the upper edge of the compartment wall 11 for circular motion within the tank 10. The tank 10 provides storage space 13 for water being clarified. The tank 10 has an upwardly extending wall 14 flanged at its upper end 15 to provide a bearing surface for the carriage 12. The upper edge of the wall 11 also has a flanged surface 16 to provide another bearing surface for the carriage 12. The tank 10 has a second upwardly extending cylindrical wall spaced from and placed within the space defined by the wall 11. Extending vertically through the center of the tank is an inlet pipe 19.

The lower portion of the wall 11 is provided with a plurality of openings 20. The lower portion of the space between the walls 11 and 14 is divided by radially extending partition members 21 positioned between the openings 20 and the wall 11. Additional horizontally extending partitions 22 made of filter material extend between the vertical partitions 21 dividing the space between the partitions 21 into upper and lower spaces. The openings 20 lead only into the lower spaces beneath the partitions 22. The upper portion of the space defined at its sides by the partitions 20 and its bottom by the filter material 22 is adapted to be filled with a particulate filter material such as sand as indicated at 24. Other suitable particulate filter material known in the art may be used alternatively.

The spaces in the sectors below the filter partition 22 define clarified water receiving spaces 25. The tank bottom is indicated at 26. The inlet pipe 19 is provided with a butterfly valve 27 controlling the incoming water flow from inlet supply pipe 29. The space inside the upwardly extending wall and the inlet pipe 19 is used as a sludge receiving space 30. A sludge outlet discharge pipe 31 leads outwardly from sludge storage space 30. A clarified water discharge pipe 32 leads from the clarified water storage space 33.

A level control switch 28 for actuation of the butterfly valve 27 and control of incoming water is positioned on the upper portion of the tank wall 14 at a suitable location for control of the valve 27 by the level of water in the tank 10.

The structure so far described is fixed and the remainder of the apparatus is supported for circular movement around the tank supported by the carriage 12. A flocculation chamber indicated generally by the numeral 38 is supported by the carriage 12, the wall of the chamber forming part of the structure of the carriage 12. The flocculation chamber 38 has a front wall 34, outer sidewall 35, inner wall 36, and an open end 37. The flocculation chamber 38 includes a vertically extending apertured partition 39 extending across the front portion thereof, the apertures in the partition decreasing in size from the outside of the tank in the inward direction so as to provide uniform distribution of fluid flow therethrough.

Figure 3:
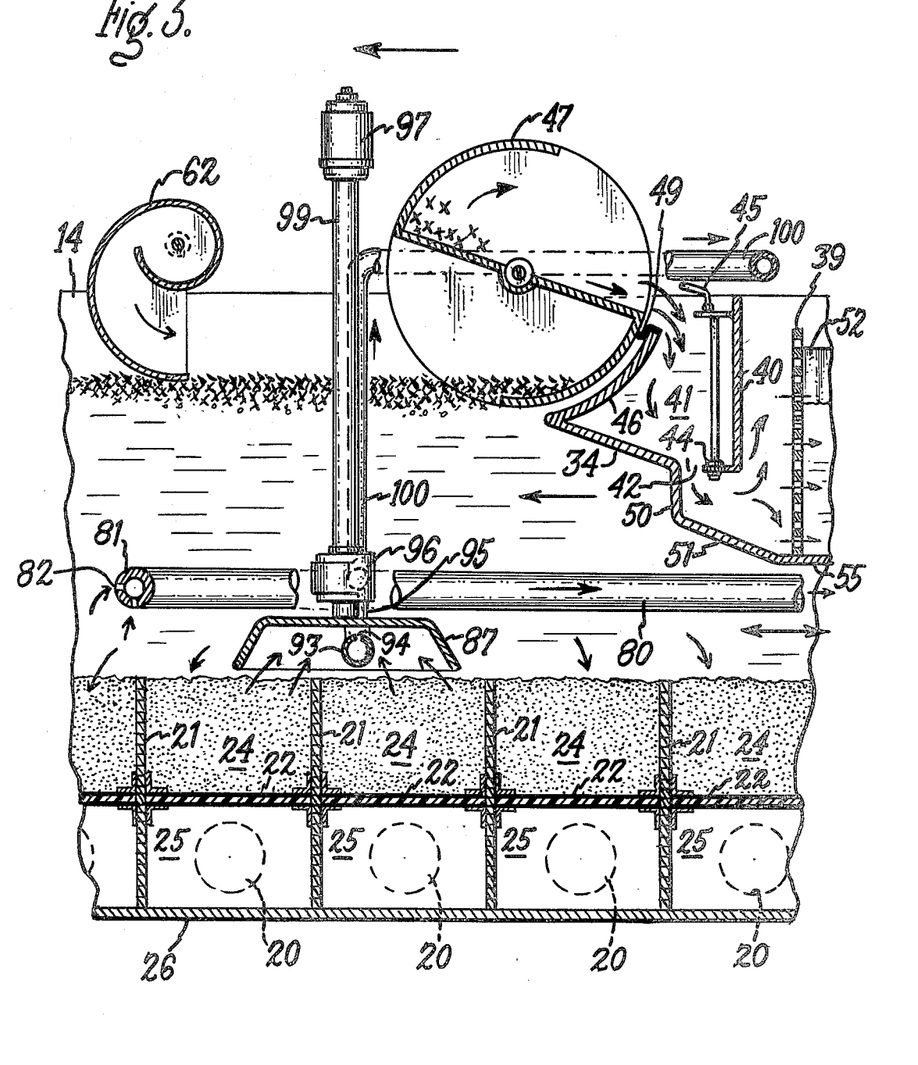
FIG. 3 is a diagrammatic view at an enlarged scale looking from the center of the apparatus towards the two scoop members.

A wall 40 (FIG. 3) spaced from the front wall 34 of the flocculation chamber 38 with a portion of its side walls 35 and 36 defines a trough 41 having a slotted opening 42 extending radially across the trough. The size of the slotted opening 42 may be varied by a closing plate 44 actuated by a control handle 45. The wall 34 is formed at its upper portion with a surface 46 conforming to the shape of a sludge recycling scoop 47 adjacent thereto. A seal member 49 made of recilient material and secured to the curved surface 46 closes the space between the curved surface 46 and the bypass scoop 47. The front wall 34 includes a vertically depending portion 50 and an inclined portion 51 shaped to direct the flow of water issuing from the slot 42 and to lessen the chance of flocs adhering to the exterior surface thereof.

Within the flocculation chamber corrugated baffle plates 52 are provided with their corrugations running in the vertical direction. The baffle plates 52 are held in a spaced relationship at the perforated wall 39 by brackets 54. The side walls 35 and 36 are of curved shape, a bottom member 55 cooperating with the side walls 35 and 36 and the front wall 34 to define the flocculation chamber 38.

The carriage 12 is supported for circular movement around the tank 10 by outside wheels 56 engaging the bearing surface 15, and by inner wheels 57 engaging the flanged surface 16. Circular movement of the carriage 12 around the tank 10 is provided by a motor 59 driving one of the wheels 56.

The inlet pipe 19 is connected through a water tight swivel coupling 60 to an inlet discharge pipe 61 carried by the carriage 12 and adapted to discharge into the trough 41 in the front end of the flocculation chamber 38. A spiral sludge collecting scoop 62 is supported by the carriage 12 and adapted to evenly collect sludge floating on water in the tank 10 and discharge the sludge into the sludge receiving space 30. The spiral discharge scoop 62 is rotated by a motor 65 with a belt drive 66. The sludge recycling scoop 47 is positioned between the spiral discharge scoop 62 in juxtaposition to the curved surface 46 for direct discharge of collected sludge into the trough 41. The scoops 62 and 47 may be adjusted in the vertical direction depending upon the desired amount of sludge each scoop is to collect. The recycling scoop 47 is rotated by a motor 69 driving the scoop 47 through a belt drive 70.

An air and water mixing tank 71 is supplied with air through a pipe 72 connected to an electric compressor 74, the air flow from the compressor 74 to the tank 71 being controlled by a valve 75. The air and water mixing tank 71 is supplied with water through a pipe 76 connected to an electric pump 79, inlet water for the pump 79 being provided through a pipe 80 terminating in an inlet manifold 81 extending radially across the lower portion of the tank 10 beneath the sludge collecting scoop 62. The inlet manifold 81 has, alternatively, an elongated slot or a series of perforations 82 positioned on the front or leading side thereof. A check valve 83 in pipe 80 prevents back flow from the pump 79. Water with air dissolved therein is dispensed into the flocculation chamber 38 by a downwardly depending pipe 84 having a radially extending inlet manifold 85 at the end thereof spaced from the flocculation chamber bottom 55. The manifold 85 has, alternatively, a discharge slot or a series of discharge openings 86 along the length thereof directed generally downward and forwardly so as to discharge the water with dissolved air ahead of the pipe 84.

Filter backwashing is provided for a portion of the filter while the remainder of the filter is actuated in the normal manner. The backwashing mechanism includes a hood 87 supported by the carriage 12 at the lower front end thereof so that the hood 87 is spaced close to the surface of the sand 24. As the carriage 12 rotates back wash water is directed successively through one of the openings 20 into one of the clarified water receiving spaces 25 by means of a flanged water discharge fitting 89 having a supply pipe 90 connected to an underwater water pump 91 powered by an electric motor 92. Water and backwashed sludge is collected under the hood 87 by a radially extending intake manifold 93 having, alternatively, a radially extending slot or series of inlet openings 94 on the top side thereof. The water and sludge collected under the hood 87 is exhausted through the manifold 93 and piping 95 by an underwater pump 96 powered by an electric motor 97 through a shaft 99 and discharged through a pipe 100 leading upwardly through a check valve 101 into the inlet discharge pipe 61 for discharge with the inlet water into trough 41.

In the operation of the apparatus in accordance with the invention water to be clarified is premixed with a flocculating agent and introduced through the inlet supply pipe 29 so that the tank 10 is filled to the desired depth. The water enters through inlet supply pipe 29 and upwardly through inlet pipe 19 past the swivel coupling 60 and the discharge pipe 61 into the trough 41. The incoming water then passes through the slot 42 in the bottom of the trough 41 into the space before the perforated plate 39 through the openings therein and between the baffles 52. By reason of the corrugated shape of the baffles 52 there is a thorough mixing of the water and the chemicals therein so that the alum reacts with hardeners in the water producing the desired flocs.

Figure 4:
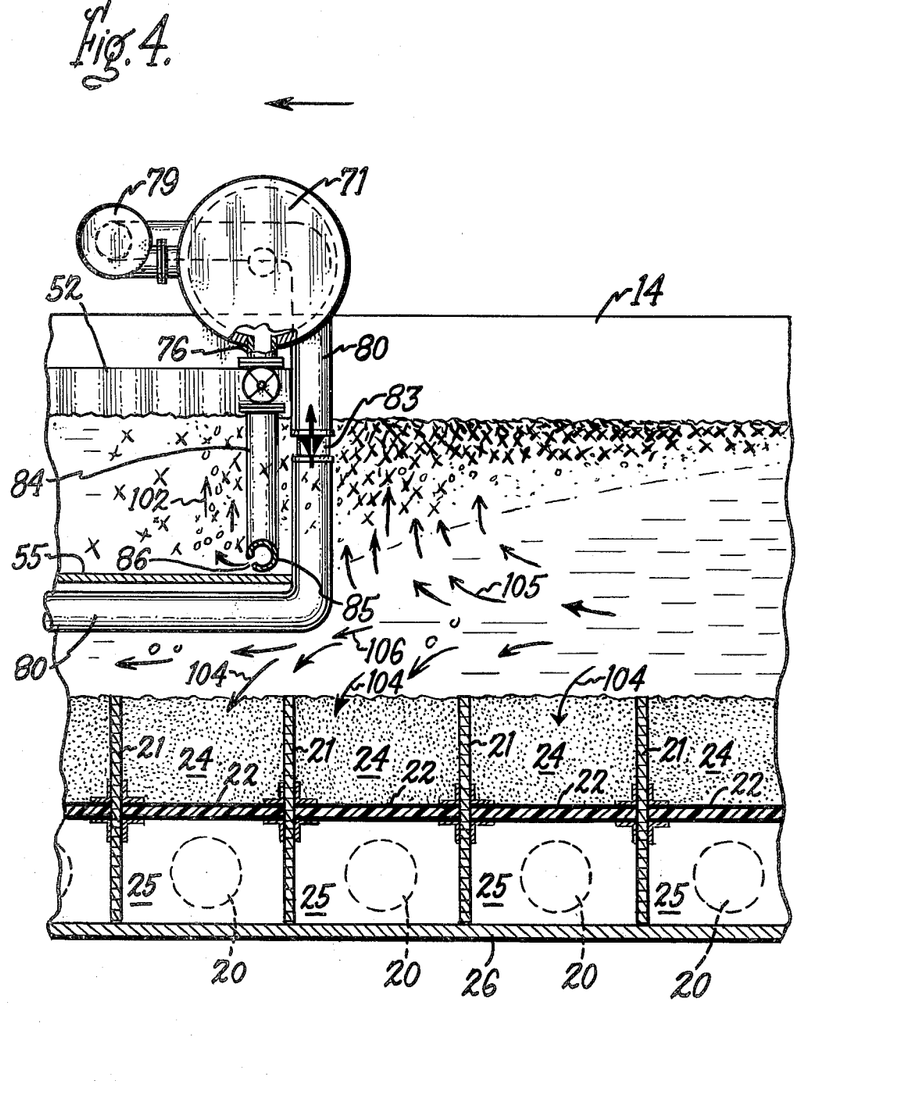
FIG. 4 is a diagrammatic view at an enlarged scale looking from the center of the apparatus outwardly toward the end of the carriage. This figure also illustrates water currents in the body of the water in the clarification tank.

Because of the small amount of impurities or particles in the water more time is required for the flocculation action. However, by the use of the corrugated baffle plates a gentle mixing action is provided that speeds up the formation of flocs without breaking earlier formed flocs and shortens the flocculation time. When the water has reached the open end 37 of the flocculation chamber 38 most of the flocs have been formed. Air and water are mixed in the air tank 71 under pressure to dissolve the air in the water which is then piped to the manifold 85 at the lower portion of the open end 37 of the flocculation chamber 38. The bubbles are discharged in microscopic size somewhat as bubbles in champagne or carbonated water and as they rise upwardly they engage the tuftlike surface of the flocs carrying the flocs upwardly therewith. The upward movement of the bubbles through the water creates a current flow indicated by the arrows 102 (FIG. 4). The carriage 12 has meanwhile been rotated around the tank 10 at a predetermined rate so that the water containing flocs leaving the flocculation chamber 38 has a practically zero horizontal flow.

The water in the lower portion of the tank 10 passes through the filter 24 at the rate of about 3 inches per minute depositing on the surface of the filter flocs and any alum which has not yet been reacted. The current flow caused by the flow of water downwardly into the filter 24 is indicated by the arrows 104. The water clarified passing through the filter 24 enters the water receiving chamber 25 and through the openings 20 into the clarified water storage space 33 and discharged through the clarified water discharge outlet 31.

Meanwhile floated flocs have risen to the surface providing a sludge, a large portion of which is collected by the spiral scoop 62 and discharged into the sludge compartment 30. The remaining portion of the floated sludge is scooped up by the bypass scope 47 and under the rotation thereof is dumped into the trough 41 where it becomes mixed with the water entering through the inlet 29 for recycling through the flocculation chamber 38.

The backwashing operation of the filter is accomplished by the provision of a flow of water by the pump 91 from the clarified water storage space 33 through the flanged discharge fitting 89 back through the openings 20 into the clarified water receiving space 25. Under the pressure of the incoming water there is an upward flow of water through the filter partition 22 and through the sand filter 24 at a rate sufficient to agitate and float the upper portion of the particles of sand in the section being backwashed, thereby loosening the particles collected on the surface of the sand particles. The hood 87 positioned over the area being backwashed confines the particles for evacuation with the water through piping 95, the pump 96 and the piping 100 for discharge into the inlet discharge pipe 61 for mixture with the incoming water and discharge into the trough 41 for recycling through the flocculation chamber 38.

It should be noted that by reason of the construction used the discharge of the pump 91 providing the backwash water is only directed into a particular sector at the time that the flanged discharge fitting 89 is in alignment with the opening 20 and while the hood 87 is directly over this sector. As the carriage 12 moves around and the flanged discharge fitting 89 closes off the opening 20 the backwash flow of water is blocked. Meanwhile suction is maintained by the pump 96 tending to evacuate the hood 87 so that backwashed particles remaining in the water directly above the filter sector being passed are removed.

The carriage 12 is slowly rotated at a rate of about one revolution in 15 minutes. Appropriate switching devices may control the operation of the backwashing mechanism so that it is operated either continuously or intermittently as required. Advantageously a level control switch may be mounted on the tank 10 in a position responsive to the water level in the clarified water storage space 33. A level switch 32 is mounted on the tank 10 responsive to the level of water therein to control the butterfly valve 27 to regulate the inlet flow so that the desired water level is maintained in the tank 10.

The improved operation of the apparatus in accordance with the invention in which clarification by both the flotation process and the filtration process is performed in the same tank results from the arrangement of the apparatus to provide current flow action which causes an improved rate of clarification of the water. Referring to FIG. 4 it will be noted that by reason of the fact that the bottom of the tank 10 is substantially entirely a filter, there is a continuous downward current flow indicated by the arrows 104 caused by the water flowing downwardly into the filter 24. Meanwhile there is an upward current flow indicated by the arrows 102 produced by the bubble flow from the air and the water carrying the dissolved air at the rear of the flocculation chamber 38 as indicated by the arrows 102. By reason of the moving of the carriage 12 there is another current flow indicated by arrows 105 produced by the current flow of water into the filter area beneath the flocculation chamber 38 as indicated by the arrows 106. It should be kept in mind that the flocculation chamber 38 extends about three eighths of the area around the tank 10. This flow of water under the flocculation chamber 38 and downwardly into the filter results in the production of the upward current flow in the body of water indicated by the arrows 105 which move upwardly thereby adding to the action of the current flow 102 produced by bubbles and the water in which they were dissolved so that there is an appreciable resulting upward current of water which carries the flocculated material with it. This resultant upward current flow is quite effective so that flotation is responsible for the removal of the majority of particles from the water while the remaining particles are removed by the filter. Of course, these particles are recycled, the result being that the apparatus does not require shut down to clean the filter 24.

In commercial embodiments of the invention apparatus is provided with tanks of various diameters ranging from 6 to 55 feet. The depth of the water in the tank 10 is from 2 to 3 feet. Such tanks are suitable for treating from 80 to 7000 gallons per minute. The water to be clarified contains a maximum of 50 to 100 turbidity units. The outflow purity of the clarified water ranges from 0.1 to 1.0 turbidity units. The power required for the operation of the apparatus is of the order of 7.0 kilowatts per 1000 gallons per minute. The retention time of the water in the tanks is of the order of 15 minutes. The weight of the apparatus with sand and water is of the order of 300 pounds per square foot and the specific clarification load is of the order of 2 to 5 gallons per minute per square foot of area.

It is apparent from the preceding description that an improved apparatus has been provided for the clarification of drinking water and the like.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:

1. An apparatus for purifying unclarified water of the type including a cylindrically shaped tank having an upwardly directed outer wall and a generally flat bottom,     an inlet pipe extending vertically through the center portion of said tank,     a cylindrically shaped compartment positioned about said inlet pipe in the center portion of said tank and having an upwardly directed outer wall,     a carriage supported between the upper portion of said tank wall and the upper portion of said compartment wall,     means for circular movement of said carriage around the vertical axis of the tank supported by said carriage, and means on said carriage supporting a fluid distributor in fluid communication with said inlet pipe to discharge inlet water into said tank, and a spiral scoop sludge collector,     the improvement comprising means defining a flocculation chamber having a closed front end, an open back end, and a closed bottom carried by said carriage,     said fluid distributor positioned ahead of the closed end of said flocculation chamber,     an upwardly directed circular wall defining a sludge storage space within said compartment around said inlet pipe to receive sludge collected by said scoop,     sludge discharge means for said sludge storage space,     said upwardly directed circular wall defining with the wall of said compartment a clarified water storage space positioned outwardly of said sludge storage space,     clarified water discharge means for said clarified water storage space,     filter means extending substantially over the bottom of said tank outwardly of said cylindrically shaped compartment, means radially dividing said filter means into horizontally positioned sections, horizontally extending filter partitions extending across said horizontally positioned sections defining filter receiving space on the top thereof, said horizontally extending filter partitions defining clarified water receiving spaces positioned thereunder, clarified water inlet means leading from said clarified water receiving space to said clarified water storage space, filter back washing means for at least one of said filter sections carried by the carriage at the leading end thereof and operable while the remainder of said filter sections are filtering water into said clarified water storage space, dissolved air in water injection means carried by the carriage at the lower back end of the flocculation chamber above the floor thereof and providing air bubble action engaging flocs in the water and producing a generally upward current flow of water and flocs in said tank in the vicinity of said bubble action, said filter means permitting the outward flow of clarified water from the lower portion of said tank thereby producing a downward current flow of water and flocs in said tank at a lesser rate than the rate of upward current flow produced by said air bubble and said water in which said air was dissolved in the vicinity thereof so that the majority of flocs in the water are floated to be removed by said spiral scoop and the remainder of the flocs are deposited on said filter means to be subsequently removed by the action of said backwashing means.

2. Apparatus in accordance with claim 1 in which a recycling scoop is positioned between said spiral sludge scoop and said flocculation chamber and adapted to collect floated sludge from the surface of said body of water and discharge said collected sludge into said flocculation chamber.

3. Apparatus in accordance with claim 1 in which said fluid distributor includes a radially extending trough carried by said carriage in fluid communication with said inlet extending downwardly into said flocculation chamber, and means defining a slot extends across the bottom of said trough for downwardly dispensing water from said trough.

4. Apparatus in accordance with claim 1 in which said fluid distributor includes a radially extending trough carried by said carriage in fluid communication with said inlet, and extending downwardly into said flocculation chamber, means defining a slot extends across the bottom of said trough for downwardly dispensing water from said trough, said flocculation chamber includes a vertically extending perforated plate extending across said chamber in spaced relationship with said slot, said perforated plate acting to evenly disperse water issuing from said slot in said trough through the body of water moving therethrough into said chamber, and said flocculation chamber including a plurality of vertically extending baffle members corrugated in the vertical direction for agitating the flow of water between said baffle members.

5. Apparatus in accordance with claim 1 in which said back washing means includes a hood carried by said carriage positioned below and ahead of the front end of said flocculation chamber, a pressure pump and piping carried by said carriage connected to transfer water from said clarified water storage chamber back through said filter means for the backwashing thereof, said water and floc collecting under said hood, an exhaust pump and piping carried by said carriage and connected to evacuate said water and floc collected under said hood and transfer same to said fluid distribution means, the exhaust pump removing a greater amount of water from under said hood than the amount of water moved through the filter means by the pressure pump so that additional water is drawn from around the edges of the hood to prevent contamination of water outwardly of said hood by said backwashing of said filter means.

6. Apparatus in accordance with claim 1 in which said filter material is in particulate form.

7. Apparatus in accordance with claim 1 in which said air injection means includes an air compressor, a water pump, an air-water mixing tank, the air compressor adapted to deliver air to the air-water mixing tank, the water pump adapted to deliver water from said tank to said air-water mixing tank, and outlet piping for said air-water tank including a radially directed perforated distribution pipe positioned at the open end of said flocculation chamber above the bottom thereof to dispense water with dissolved air so as to produce bubble action in said water and produce upwardly directed currents of water therein.

8. The method of clarifying water having suspended particles therein comprising providing a body of said water in a circular tank having a filter chamber extending over substantially its entire lower surface so that the flow of water through the filter provides an even downward current in the body of water, mixing additional water to be clarified with flocculating material, providing a distribution and open ended flocculation chamber immersed in said tank of water, said flocculation chamber being of a size relative to the quantity of inlet water introduced therein so that the majority of flocculation action is achieved within said chamber, introducing said water with flocculating material into said distribution and flocculation chamber at the same rate as water is passed through said filter while moving said distribution and flocculation chamber circularly within said tank, providing a dissolved air in water source with a discharge therefor positioned at the lower portion of said open ended flocculation chamber, and discharging the dissolved air in water at a predetermined rate thereby providing an even upward current moving flocs upwardly in the body of water in the vicinity of said open-ended flocculation chamber at a flow rate greater than the rate of the rate of the downward current caused by water passing through the filter so that the majority of the particles in the water are carried upwardly with flocs and the remainder of the particles are blocked by the filter whereby water discharged from the filter is clarified.

9. The method of clarifying water having suspended particles therein comprising providing a body of said water in a circular tank having a filter chamber extending over substantially its entire lower surface so that the flow of water through the filter provides an even downward current in the body of water, mixing additional water to be clarified with flocculating material, providing a distribution and open ended flocculation chamber immersed in said tank of water, said flocculation chamber being of a size relative to the quantity of inlet water introduced therein so that the majority of flocculation action is achieved within said chamber, introducing said water with flocculating material into said distribution and flocculation chamber at the same rate as water is passed through said filter while moving said distribution and flocculation chamber circularly within said tank, providing a back washing hood extending over a portion of said filter chamber and a pressure pump and an exhaust pump, moving said hood over said filter ahead of said flocculation chamber, backwashing said filter chamber in the area under said hood using said pressure pump, exhausting water containing flocs from under said hood using said exhaust pump and discharging said water containing flocs into said flocculation chamber, providing a dissolved air in water source with a discharge therefor positioned at the lower portion of said open ended flocculation chamber, and discharging the dissolved air in water at a predetermined rate thereby providing an even upward current moving flocs upwardly in the body of water in the vicinity of said open-ended flocculation chamber at a flow rate greater than the rate of the downward current caused by water passing through the filter so that the majority of the particles in the water are carried upwardly with flocs and the remainder of the particles are blocked by the filter whereby water discharged from the filter is clarified.

* * * * *